US012664515B1

(12) United States Patent
Brewster et al.

(10) Patent No.: US 12,664,515 B1
(45) Date of Patent: Jun. 23, 2026

(54) COMMAND SEQUENCE FOR INITIATING INVENTORYING

(71) Applicant: Impinj, Inc., Seattle, WA (US)

(72) Inventors: Megan Marie Brewster, Seattle, WA (US); Jesse Paul Cooke, Seattle, WA (US); Christopher J. Diorio, Shoreline, WA (US); Rene Dominic Martinez, Seattle, WA (US); Matthew Robshaw, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 167 days.

(21) Appl. No.: 18/777,628

(22) Filed: Jul. 19, 2024

Related U.S. Application Data

(60) Provisional application No. 63/514,869, filed on Jul. 21, 2023.

(51) Int. Cl.
G06Q 10/087 (2023.01)
G08B 13/24 (2006.01)

(52) U.S. Cl.
CPC ....... G06Q 10/087 (2013.01); G08B 13/2451 (2013.01)

(58) Field of Classification Search
CPC .................................................... G06Q 10/087
See application file for complete search history.

(56) References Cited

U.S. PATENT DOCUMENTS

| | | | | |
|---|---|---|---|---|
| 9,104,923 | B1 * | 8/2015 | Stanford | ............ G06K 7/10297 |
| 2008/0111664 | A1 * | 5/2008 | Maguire | .............. G06K 7/0008 |
| | | | | 340/10.4 |
| 2008/0180221 | A1 * | 7/2008 | Tuttle | ................. G06K 7/10356 |
| | | | | 340/10.2 |
| 2010/0127829 | A1 * | 5/2010 | Daneshmand | ....... G06K 7/0008 |
| | | | | 340/10.1 |

* cited by examiner

*Primary Examiner* — Thomas S McCormack
(74) *Attorney, Agent, or Firm* — Turk IP Law, LLC

(57) ABSTRACT

Examples are directed to modifying RFID tag inventorying. A sequence of consecutive inventorying commands may be used to initiate an inventory round incorporating a selection functionality for efficient inventorying of large numbers of RFID tags. A command sequence may begin with a first inventorying command followed by one or more subsequent, consecutive inventorying commands, with each inventorying command defining a different filter criterion such that sub-group(s) of RFID tags identified by the combination of filter criteria may participate in the initiated inventory round. All inventorying commands in the sequence share a command code, but each inventorying command also has a starting signal and a continuation indicator, both used to begin, continue, and terminate the sequence.

20 Claims, 12 Drawing Sheets

100

100
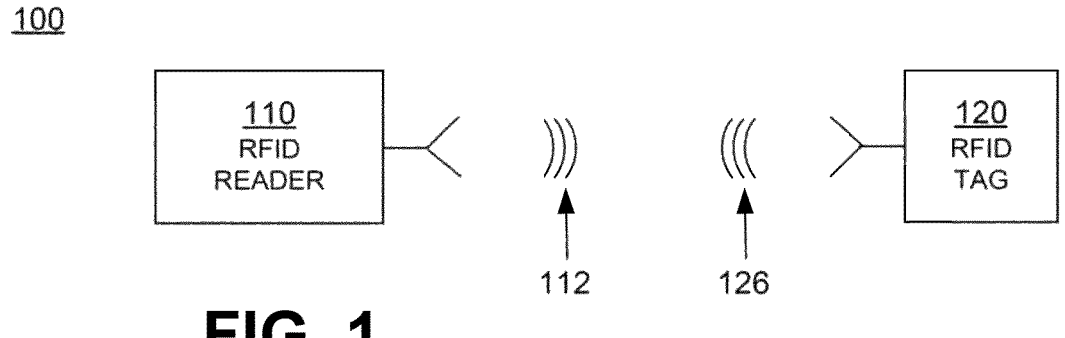
FIG. 1
200
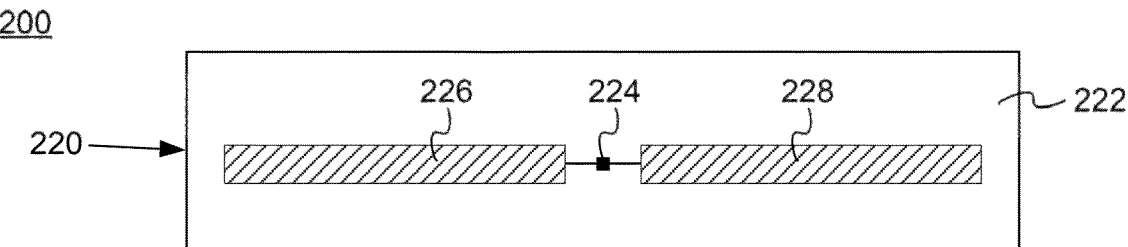
250
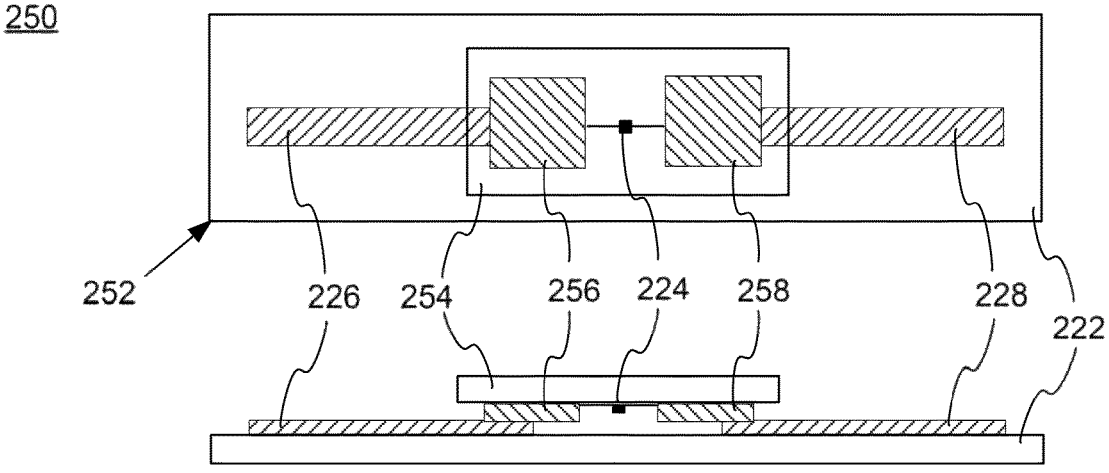
260
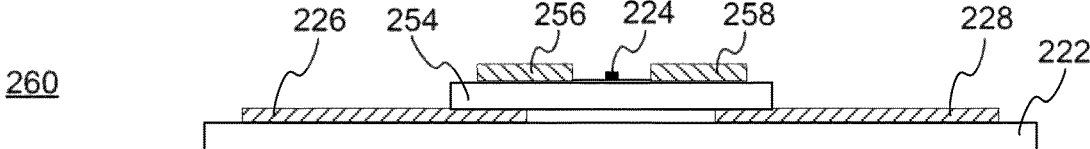
FIG. 2

300

*RFID SYSTEM COMMUNICATION*

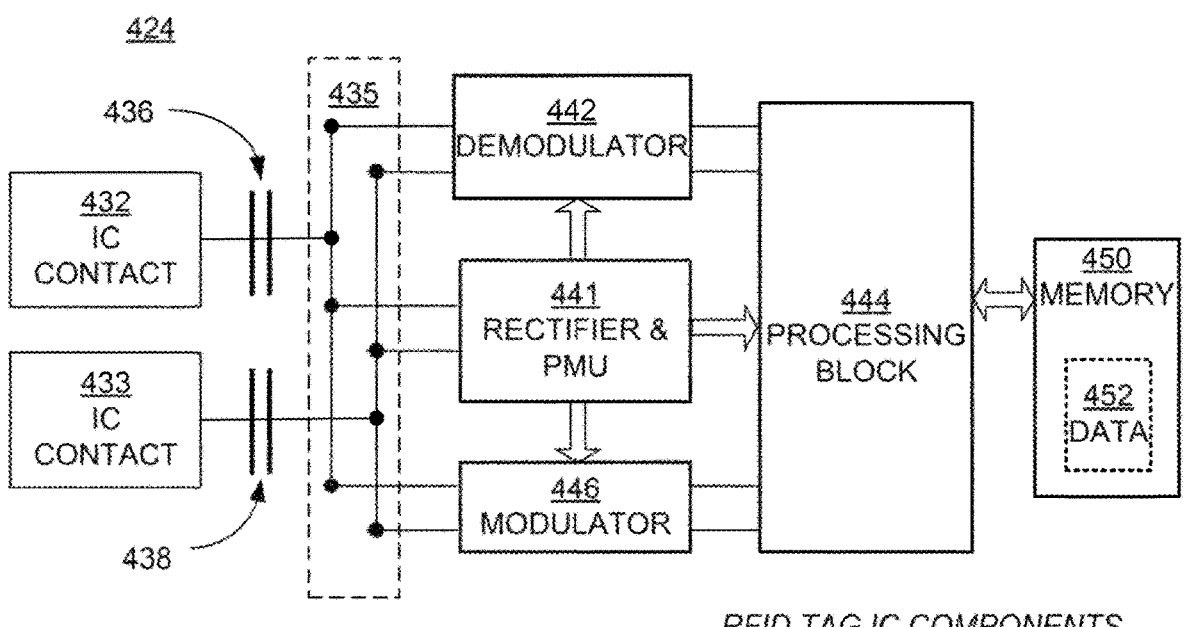
FIG. 4
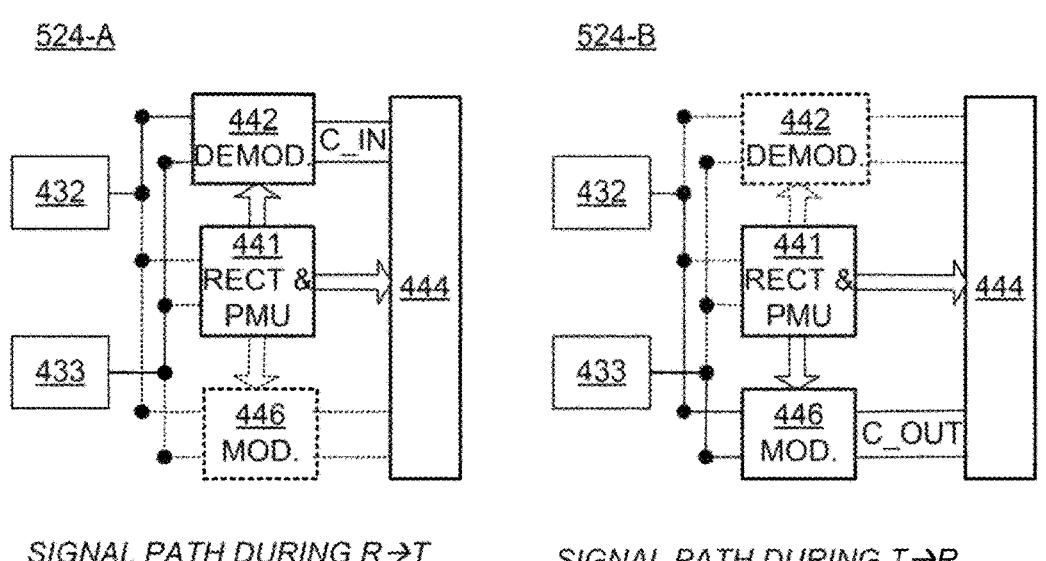
FIG. 5A          FIG. 5B

810 *Query* command

| | Command | DR | M | TRext | Sel | Session | Target | Q | CRC |
|---|---|---|---|---|---|---|---|---|---|
| # of bits | 4 | 1 | 2 | 1 | 2 | 2 | 1 | 4 | 5 |
| description | 1000 | 0: DR=8<br>1: DR=64/3 | 00: M=1<br>01: M=2<br>10: M=4<br>11: M=8 | 0: No pilot tone<br>1: Use pilot tone | 00: All<br>01: All<br>10: ~SL<br>11: SL | 00: S0<br>01: S1<br>10: S2<br>11: S3 | 0: A<br>1: B | 0~15 | CRC-5 |

FIG. 8A

820 *Select* command

| | Command | Target | Action | MemBank | Pointer | Length | Mask | Truncate | CRC |
|---|---|---|---|---|---|---|---|---|---|
| # of bits | 4 | 3 | 3 | 2 | EBV | 8 | Variable | 1 | 16 |
| description | 1010 | 000: Inventoried (S0)<br>001: Inventoried (S1)<br>010: Inventoried (S2)<br>011: Inventoried (S3)<br>100: SL<br>101: RFU<br>110: RFU<br>111: RFU | See Table 6.30 | 00: FileType<br>01: EPC<br>10: TID<br>11: File_0 | Starting Mask address | Mask length (bits) | Mask value | 0: Disable truncation<br>1: Enable truncation | CRC-16 |

QueryX, first portion

QueryY

| | Cmd | Init | Session | Action | SelTarget | EastMask | M | Filter (included if Bit=1, excluded if Bit=0) | | | | | |
|---|---|---|---|---|---|---|---|---|---|---|---|---|---|
| | | | | | | | | Comp | MemBank | Pointer | Length | Mask | Truncate |
| # of bits | 4 | 1 | 2 | 3 | 3 | 0 or 9 | 1 | 0 or 2 | 0 or 2 | 0 or EBV | 0 or 8 | variable | 0 or 1 |
| desc | 1011 | 0: Continue initializing inventory round with QueryX  1: Complete initializing inventory round | 00: S0  01: S1  10: S2  11: S3 | See Select? | See TableXX? | See TableXX? | 0: No filter  1: Filter included | 00: >=  01: <=  10: <>  11: = | 00: Not-matching  01: EPC  10: TID  11: File_0 | Start Mask address | Mask length | Mask value | 0: Disable Truncation  1: Enable Truncation |

FIG. 9A

QueryX, second portion

910  
920

| Field | Bits | Description |
|---|---|---|
| CRC | 16 | CRC-16 |
| Q | 4 | 0-15 |
| Target | 1 | 0: A   1: B |
| Sel | 2 | 00: All   01: All   10: ~SL   11: SL |
| TRext | 1 | 0: No pilot tone   1: Use pilot tone |
| M | 2 | 00: M=1   01: M=2   10: M=4   11: M=8 |
| DR | 1 | 0: DR=8   1: DR=64/3 |
| CMLF | 3 | See Table 6-9 |
| AddData | 2 | 00: Terminate initializing inventory round   01: EPC   10: TID   11: Terminate initializing inventory round |
| ReplyCRC | 1 | 0: Reply with RN16   1: Reply with RN16 CRC5 |

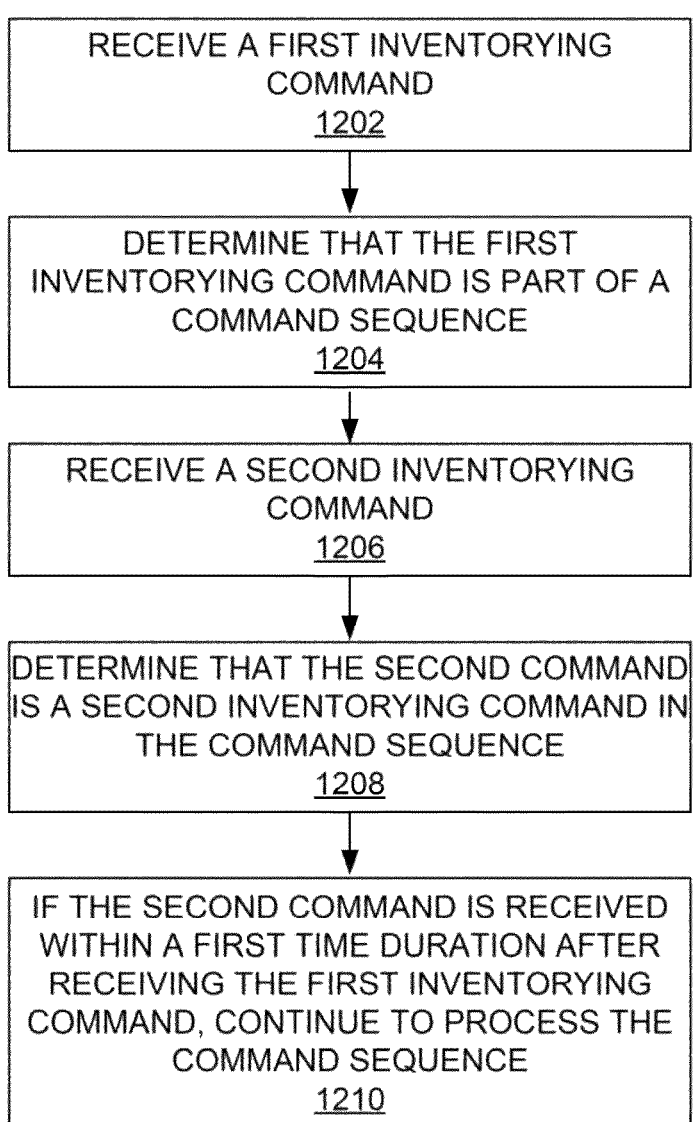

RECEIVE A FIRST INVENTORYING
COMMAND
1202

DETERMINE THAT THE FIRST
INVENTORYING COMMAND IS PART OF A
COMMAND SEQUENCE
1204

RECEIVE A SECOND INVENTORYING
COMMAND
1206

DETERMINE THAT THE SECOND COMMAND
IS A SECOND INVENTORYING COMMAND IN
THE COMMAND SEQUENCE
1208

IF THE SECOND COMMAND IS RECEIVED
WITHIN A FIRST TIME DURATION AFTER
RECEIVING THE FIRST INVENTORYING
COMMAND, CONTINUE TO PROCESS THE
COMMAND SEQUENCE
1210

FIG. 12

COMMAND SEQUENCE FOR INITIATING INVENTORYING

CROSS-REFERENCE TO RELATED APPLICATIONS

This application claims priority to U.S. Provisional Patent Application Ser. No. 63/514,869 filed on Jul. 21, 2023. The disclosures of the Provisional Application are hereby incorporated by reference in their entirety.

BACKGROUND

Radio-Frequency Identification (RFID) systems typically include RFID readers, also known as RFID reader/writers or RFID interrogators, and RFID tags. RFID systems can be used in many ways for locating and identifying objects to which the tags are attached. RFID systems are useful in product-related and service-related industries for tracking objects being processed, inventoried, or handled. In such cases, an RFID tag is usually attached to an individual item, or to its package. The RFID tag typically includes, or is, a radio-frequency (RF) integrated circuit (IC).

In principle, RFID techniques entail using an RFID reader to inventory one or more RFID tags, where inventorying involves singulating a tag, receiving an identifier from a tag, and/or acknowledging a received identifier (e.g., by transmitting an acknowledge command). "Singulated" is defined as a reader singling-out one tag, potentially from among multiple tags, for a reader-tag dialog. "Identifier" is defined as a number identifying the tag or the item to which the tag is attached, such as a tag identifier (TID), electronic product code (EPC), etc. An "inventory round" is defined as a reader staging RFID tags for successive inventorying. The reader transmitting an RF wave performs the inventory. The RF wave is typically electromagnetic, at least in the far field. The RF wave can also be predominantly electric or magnetic in the near or transitional near field. The RF wave may encode one or more commands that instruct the tags to perform one or more actions. The operation of an RFID reader sending commands to an RFID tag is sometimes known as the reader "interrogating" the tag.

In typical RFID systems, an RFID reader transmits a modulated RF inventory signal (a command), receives a tag reply, and transmits an RF acknowledgment signal responsive to the tag reply. A tag that replies to the interrogating RF wave does so by transmitting back another RF wave. The tag either generates the transmitted back RF wave originally, or by reflecting back a portion of the interrogating RF wave in a process known as backscatter. Backscatter may take place in a number of ways.

The reflected-back RF wave may encode data stored in the tag, such as a number. The response is demodulated and decoded by the reader, which thereby identifies, counts, or otherwise interacts with the associated item. The decoded data can denote a serial number, a price, a date, a time, a destination, an encrypted message, an electronic signature, other attribute(s), any combination of attributes, and so on. Accordingly, when a reader receives tag data it can learn about the item that hosts the tag and/or about the tag itself.

An RFID tag typically includes an antenna section, a radio section, a power-management section, and frequently a logical section, a memory, or both. In some RFID tags the power-management section includes an energy storage device such as a battery. RFID tags with an energy storage device are known as battery-assisted, semi-active, or active tags. Other RFID tags can be powered solely by the RF signal they receive. Such RFID tags do not include an energy storage device and are called passive tags. Of course, even passive tags typically include temporary energy- and data/flag-storage elements such as capacitors or inductors.

BRIEF SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Examples are directed to modifying RFID tag inventorying. A sequence of consecutive inventorying commands may be used to initiate an inventory round incorporating a selection functionality for efficient inventorying of large numbers of RFID tags. In some examples, a first inventorying command may be followed by one or more subsequent, consecutive inventorying commands, with each inventorying command defining a different filter criterion such that sub-group(s) of RFID tags identified by the combination of filter criteria may participate in the initiated inventory round. A timing of the first and subsequent, consecutive inventorying commands may be selected such that after a predefined time period following the initial command (e.g., QueryX) in the sequence, if a tag does not receive a subsequent command (QueryY), the command sequence is aborted or discarded. If the subsequent command is received within the predefined period, the tag interprets it as part of the command sequence and waits for another (same) time period for yet another command in the sequence.

In other examples, the sequential inventorying commands may share the same command code but have different starting signals depending on each inventorying command's position in the sequence allowing the tag(s) to identify the command sequence and the individual inventorying commands within the sequence. The starting signals may be a preamble or a frame-sync. A tag receiving the first command in the sequence (e.g., QueryX) may determine that this is a first command in a sequence and await one or more follow up command(s) (e.g., QueryY) before taking any action. Once the tag determines it has received all commands in the sequence, it may perform the actions such as determining whether the tag fits all selection criteria defined in the commands and participate or not participate in the inventory round based on the determination.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

The following Detailed Description proceeds with reference to the accompanying drawings, in which:

FIG. 1 is a block diagram of components of an RFID system.

FIG. 2 is a diagram showing components of a passive RFID tag, such as a tag that can be used in the system of FIG. 1.

FIG. 4 is a block diagram showing a detail of an RFID tag, such as the one shown in FIG. 2.

FIGS. 5A and 5B illustrate signal paths during tag-to-reader and reader-to-tag communications in the block diagram of FIG. 4.

FIGS. 8A and 8B illustrate command structures of Query and Select commands according to the Gen2 Protocol.

FIGS. 9A and 9B provide an overview of the QueryX and QueryY command structures, according to examples.

FIG. 12 illustrates a flow diagram of a method to use sequential commands in initiating inventorying according to embodiments.

DETAILED DESCRIPTION

Figure 3:
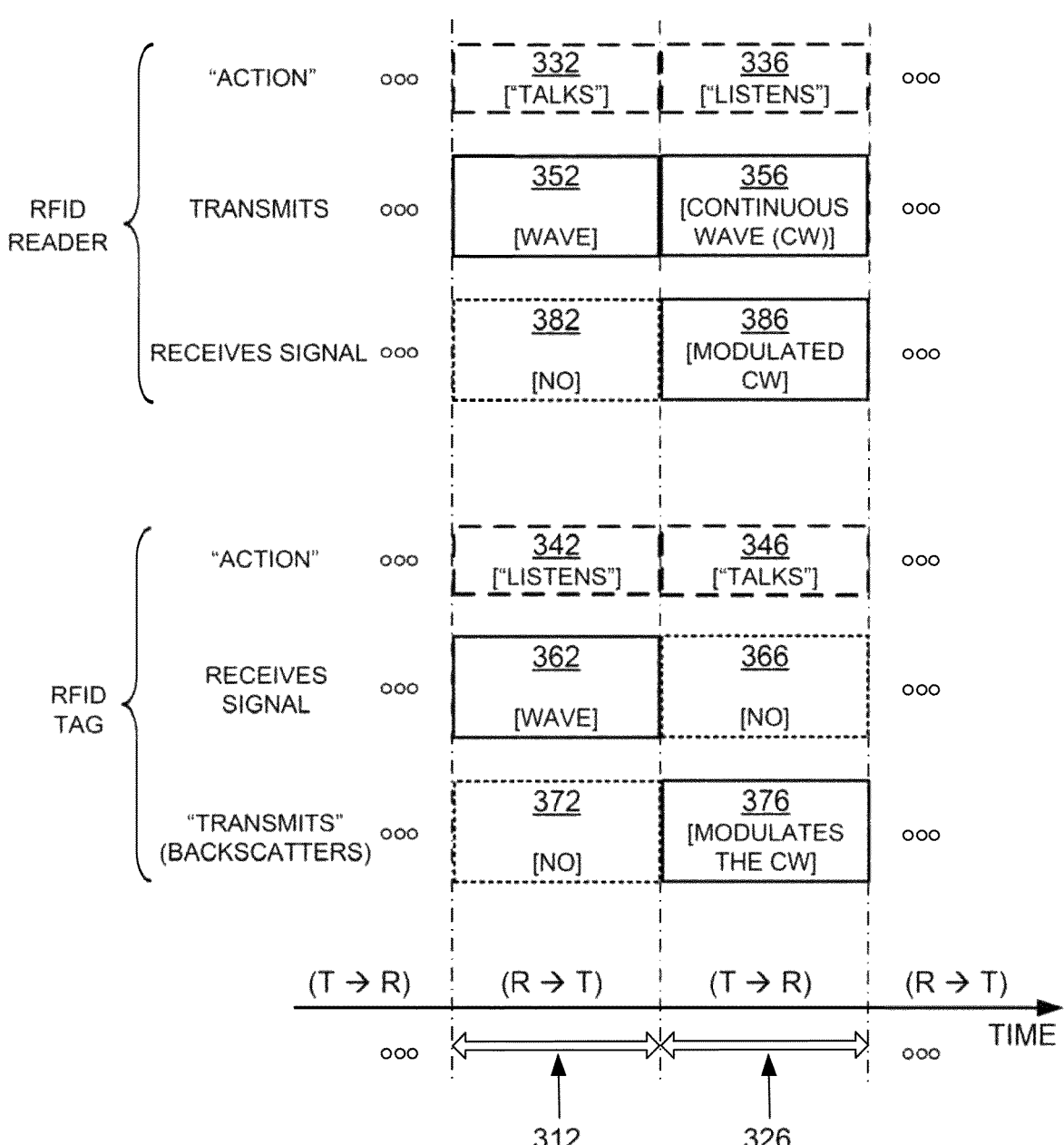
FIG. 3 is a conceptual diagram for explaining a half-duplex mode of communication between the components of the RFID system of FIG. 1.

In the following detailed description, references are made to the accompanying drawings that form a part hereof, and in which are shown by way of illustration specific embodiments or examples. These embodiments or examples may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

As used herein, "memory" is one of ROM, RAM, SRAM, DRAM, NVM, EEPROM, FLASH, Fuse, MRAM, FRAM, and other similar volatile and nonvolatile information-storage technologies. Some portions of memory may be writeable and some not. "Instruction" refers to a request to a tag to perform a single explicit action (e.g., write data into memory). "Command" refers to a reader request for one or more tags to perform one or more actions and includes one or more tag instructions preceded by a command identifier or command code that identifies the command and/or the tag instructions. "Program" refers to a request to a tag to perform a set or sequence of instructions (e.g., read a value from memory and, if the read value is less than a threshold then lock a memory word). "Protocol" refers to an industry standard for communications between a reader and a tag (and vice versa). One such protocol is the Class-1 Generation-2 UHF RFID Protocol for Communications at 860 MHz-960 MHz by GS1 EPCglobal, Inc. ("the Gen2 Protocol"), versions 1.2.0, 2.0, and 3.0 of which are hereby incorporated by reference. Another protocol is the ISO/IEC 18000-63 Information technology—Radio frequency identification for item management—Part 63: Parameters for air interface communications at 860 MHz to 960 MHz Type C ("ISO/IEC 18000-63"), also hereby incorporated by reference.

In environments with a large number of RFID-tagged items, being able to specifically talk to a tag subpopulation of interest is becoming increasingly important. Under some protocols, such as the Gen2 Protocol prior to version 3.0, a Select command may be the only method to choose particular tag subpopulations for subsequent inventorying. However, a Select command has a limited payload. Consecutive Select commands may be used, but not all tags may hear all the Select commands. As a result, matching tags may not end up participating in inventorying, while mismatching tags may end up participating.

There are numerous technical advantages of the example implementations. For example, an inventorying command sequence with multiple consecutive commands may allow selection (and subsequent participation in an inventory round) of various subpopulations of RFID tags. Furthermore, as the tags can confirm the sequence, erroneous participation or non-participation problems may be reduced or avoided. The inventory process may also occur faster with the selection of subpopulations and inventorying happening within a single chain of commands.

Of course, tags may be configured to operate using various standard protocols (e.g., the Gen2 Protocol and/or ISO/IEC 18000-63) and the sequential inventorying commands.

FIG. 1 is a diagram of the components of a typical RFID system 100, incorporating embodiments. An RFID reader 110 and a nearby RFID tag 120 communicate via RF signals 112 and 126. When sending data to tag 120, reader 110 may generate RF signal 112 by encoding the data, modulating an RF waveform with the encoded data, and transmitting the modulated RF waveform as RF signal 112. In turn, tag 120 may receive RF signal 112, demodulate encoded data from RF signal 112, and decode the encoded data. Similarly, when sending data to reader 110 tag 120 may generate RF signal 126 by encoding the data, modulating an RF waveform with the encoded data, and causing the modulated RF waveform to be sent as RF signal 126. The data sent between reader 110 and tag 120 may be represented by symbols, also known as RFID symbols. A symbol may be a delimiter, a calibration value, or implemented to represent binary data, such as "0" and "1", if desired. Upon processing by reader 110 and tag 120, symbols may be treated as values, numbers, or any other suitable data representations.

The RF waveforms transmitted by reader 110 and/or tag 120 may be in a suitable range of frequencies, such as those near 900 MHz, 13.56 MHz, or similar. In some embodiments, RF signals 112 and/or 126 may include non-propagating RF signals, such as reactive near-field signals or similar. RFID tag 120 may be active or battery-assisted (i.e., possessing its own power source), or passive. In the latter case, RFID tag 120 may harvest power from RF signal 112.

FIG. 2 is a diagram of an RFID tag 220, which may function as tag 120 of FIG. 1. Tag 220 may be formed on a substantially planar inlay 222, which can be made in any suitable way. Tag 220 includes a circuit which may be implemented as an IC 224. In some embodiments IC 224 is fabricated in complementary metal-oxide semiconductor (CMOS) technology. In other embodiments IC 224 may be fabricated in other technologies such as bipolar junction transistor (BJT) technology, metal-semiconductor field-effect transistor (MESFET) technology, and others as will be well known to those skilled in the art. IC 224 is arranged on inlay 222.

Tag 220 also includes an antenna for transmitting and/or interacting with RF signals. In some embodiments the antenna can be etched, deposited, and/or printed metal on inlay 222; conductive thread formed with or without substrate 222; nonmetallic conductive (such as graphene) patterning on substrate 222; a first antenna coupled inductively, capacitively, or galvanically to a second antenna; or can be fabricated in myriad other ways that exist for forming antennas to receive RF waves. In some embodiments the antenna may even be formed in IC 224. Regardless of the antenna type, IC 224 is electrically coupled to the antenna via suitable IC contacts (not shown in FIG. 2). The term "electrically coupled" as used herein may mean a direct electrical connection, or it may mean a connection that includes one or more intervening circuit blocks, elements, or devices. The "electrical" part of the term "electrically coupled" as used in this document shall mean a coupling that is one or more of ohmic/galvanic, capacitive, and/or inductive. Similarly, the terms "electrically isolated" or "electrically decoupled" as used herein mean that electrical coupling of one or more types (e.g., galvanic, capacitive, and/or inductive) is not present, at least to the extent possible. For example, elements that are electrically isolated from each other are galvanically isolated from each other, capacitively isolated from each other, and/or inductively isolated from each other. Of course, electrically isolated components will generally have some unavoidable stray capacitive or inductive coupling between them, but the intent of the isolation is to minimize this stray coupling when compared with an electrically coupled path.

IC 224 is shown with a single antenna port, comprising two IC contacts electrically coupled to two antenna segments 226 and 228 which are shown here forming a dipole. Many other embodiments are possible using any number of ports, contacts, antennas, and/or antenna segments. Antenna segments 226 and 228 are depicted as separate from IC 224, but in other embodiments the antenna segments may alternatively be formed on IC 224. Tag antennas according to embodiments may be designed in any form and are not limited to dipoles. For example, the tag antenna may be a patch, a slot, a loop, a coil, a horn, a spiral, a monopole, microstrip, stripline, or any other suitable antenna.

Diagram 250 depicts top and side views of tag 252, formed using a strap. Tag 252 differs from tag 220 in that it includes a substantially planar strap substrate 254 having strap contacts 256 and 258. IC 224 is mounted on strap substrate 254 such that the IC contacts on IC 224 electrically couple to strap contacts 256 and 258 via suitable connections (not shown). Strap substrate 254 is then placed on inlay 222 such that strap contacts 256 and 258 electrically couple to antenna segments 226 and 228. Strap substrate 254 may be affixed to inlay 222 via pressing, an interface layer, one or more adhesives, or any other suitable means.

Diagram 260 depicts a side view of an alternative way to place strap substrate 254 onto inlay 222. Instead of strap substrate 254's surface, including strap contacts 256/258, facing the surface of inlay 222, strap substrate 254 is placed with its strap contacts 256/258 facing away from the surface of inlay 222. Strap contacts 256/258 can then be either capacitively coupled to antenna segments 226/228 through strap substrate 254, or conductively coupled using a through-via which may be formed by crimping strap contacts 256/258 to antenna segments 226/228. In some embodiments, the positions of strap substrate 254 and inlay 222 may be reversed, with strap substrate 254 mounted beneath inlay 222 and strap contacts 256/258 electrically coupled to antenna segments 226/228 through inlay 222. Of course, in yet other embodiments strap contacts 256/258 may electrically couple to antenna segments 226/228 through both inlay 222 and strap substrate 254.

In operation, the antenna couples with RF signals in the environment and propagates the signals to IC 224, which may both harvest power and respond if appropriate, based on the incoming signals and the IC's internal state. If IC 224 uses backscatter modulation then it may generate a response signal (e.g., signal 126) from an RF signal in the environment (e.g., signal 112) by modulating the antenna's reflectance. Electrically coupling and uncoupling the IC contacts of IC 224 can modulate the antenna's reflectance, as can varying the admittance or impedance of a shunt-connected or series-connected circuit element which is coupled to the IC contacts. If IC 224 is capable of transmitting signals (e.g., has its own power source, is coupled to an external power source, and/or can harvest sufficient power to transmit signals), then IC 224 may respond by transmitting response signal 126. In the embodiments of FIG. 2, antenna segments 226 and 228 are separate from IC 224. In other embodiments, the antenna segments may alternatively be formed on IC 224.

An RFID tag such as tag 220 is often attached to or associated with an individual item or the item packaging. An RFID tag may be fabricated and then attached to the item or packaging, may be partly fabricated before attachment to the item or packaging and then completely fabricated upon attachment to the item or packaging, or the manufacturing process of the item or packaging may include the fabrication of the RFID tag. In some embodiments, the RFID tag may be integrated into the item or packaging. In this case, portions of the item or packaging may serve as tag components. For example, conductive item or packaging portions may serve as tag antenna segments or contacts. Nonconductive item or packaging portions may serve as tag substrates or inlays. If the item or packaging includes integrated circuits or other circuitry, some portion of the circuitry may be configured to operate as part or all of an RFID tag IC. Thus, an "RFID IC" need not be distinct from an item, but more generally refers to the item containing an RFID IC and antenna capable of interacting with RF waves and receiving and responding to RFID signals. Because the boundaries between IC, tag, and item are thus often blurred, the terms "RFID IC", "RFID tag", "tag", or "tag IC" as used herein may refer to the IC, the tag, or even to the item as long as the referenced element is capable of RFID functionality.

The components of the RFID system of FIG. 1 may communicate with each other in any number of modes. One such mode is called full duplex, where both reader 110 and tag 120 can transmit at the same time. In some embodiments, RFID system 100 may be capable of full duplex communication. Another such mode, which may be more suitable for passive tags, is called half-duplex, and is described below.

FIG. 3 is a conceptual diagram 300 for explaining half-duplex communications between the components of the RFID system of FIG. 1, in this case with tag 120 implemented as a passive tag. The explanation is made with reference to a TIME axis, and also to a human metaphor of "talking" and "listening". The actual technical implementations for "talking" and "listening" are now described.

In a half-duplex communication mode, RFID reader 110 and RFID tag 120 talk and listen to each other by taking turns. As seen on axis TIME, reader 110 talks to tag 120 during intervals designated "R→T", and tag 120 talks to reader 110 during intervals designated "T→R". For example, a sample R→T interval occurs during time interval 312, during which reader 110 talks (block 332) and tag 120 listens (block 342). A following sample T→R interval occurs during time interval 326, during which reader 110 listens (block 336) and tag 120 talks (block 346). Interval 312 may be of a different duration than interval 326—here the durations are shown approximately equal only for purposes of illustration.

During interval 312, reader 110 transmits a signal such as signal 112 described in FIG. 1 (block 352), while tag 120 receives the reader signal (block 362), processes the reader signal to extract data, and harvests power from the reader signal. While receiving the reader signal, tag 120 does not backscatter (block 372), and therefore reader 110 does not receive a signal from tag 120 (block 382).

During interval 326, also known as a backscatter time interval or backscatter interval, reader 110 does not transmit a data-bearing signal. Instead, reader 110 transmits a continuous wave (CW) signal, which is a carrier that generally does not encode information. The CW signal provides energy for tag 120 to harvest as well as a waveform that tag 120 can modulate to form a backscatter response signal. Accordingly, during interval 326 tag 120 is not receiving a signal with encoded information (block 366) and instead modulates the CW signal (block 376) to generate a backscatter signal such as signal 126 described in FIG. 2. Tag 120 may modulate the CW signal to generate a backscatter signal by adjusting its antenna reflectance, as described above. Reader 110 then receives and processes the backscatter signal (block 386).

FIG. 4 is a block diagram showing a detail of an RFID IC, such as IC 224 in FIG. 2. Electrical circuit 424 may be implemented in an IC, such as IC 224. Circuit 424 implements at least two IC contacts 432 and 433, suitable for coupling to antenna segments such as antenna segments 226/228 in FIG. 2. When two IC contacts form the signal input from and signal return to an antenna they are often referred-to as an antenna port. IC contacts 432 and 433 may be made in any suitable way, such as from electrically-conductive pads, bumps, or similar. In some embodiments circuit 424 implements more than two IC contacts, especially when configured with multiple antenna ports and/or to couple to multiple antennas.

Circuit 424 includes signal-routing section 435 which may include signal wiring, signal-routing busses, receive/transmit switches, and similar that can route signals between the components of circuit 424. IC contacts 432/433 may couple galvanically, capacitively, and/or inductively to signal-routing section 435. For example, optional capacitors 436 and/or 438 may capacitively couple IC contacts 432/433 to signal-routing section 435, thereby galvanically decoupling IC contacts 432/433 from signal-routing section 435 and other components of circuit 424.

Capacitive coupling (and the resultant galvanic decoupling) between IC contacts 432 and/or 433 and components of circuit 424 is desirable in certain situations. For example, in some RFID tag embodiments IC contacts 432 and 433 may galvanically connect to terminals of a tuning loop on the tag. In these embodiments, galvanically decoupling IC contact 432 from IC contact 433 may prevent the formation of a DC short circuit between the IC contacts through the tuning loop.

Capacitors 436/438 may be implemented within circuit 424 and/or partly or completely external to circuit 424. For example, a dielectric or insulating layer on the surface of the IC containing circuit 424 may serve as the dielectric in capacitor 436 and/or capacitor 438. As another example, a dielectric or insulating layer on the surface of a tag substrate (e.g., inlay 222 or strap substrate 254) may serve as the dielectric in capacitors 436/438. Metallic or conductive layers positioned on both sides of the dielectric layer (i.e., between the dielectric layer and the IC and between the dielectric layer and the tag substrate) may then serve as terminals of the capacitors 436/438. The conductive layers may include IC contacts (e.g., IC contacts 432/433), antenna segments (e.g., antenna segments 226/228), or any other suitable conductive layers.

Circuit 424 includes a rectifier and PMU (Power Management Unit) 441 that harvests energy from the RF signal incident on antenna segments 226/228 to power the circuits of IC 424 during either or both reader-to-tag (R→T) and tag-to-reader (T→R) intervals. Rectifier and PMU 441 may be implemented in any way known in the art, and may include one or more components configured to convert an alternating-current (AC) or time-varying signal into a direct-current (DC) or substantially time-invariant signal.

Circuit 424 also includes a demodulator 442, a processing block 444, a memory 450, and a modulator 446. Demodulator 442 demodulates the RF signal received via IC contacts 432/433, and may be implemented in any suitable way, for example using a slicer, an amplifier, and other similar components. Processing block 444 receives the output from demodulator 442, performs operations such as command decoding, memory interfacing, and other related operations, and may generate an output signal for transmission. Processing block 444 may be implemented in any suitable way, for example by combinations of one or more of a processor, memory, decoder, encoder, and other similar components. Memory 450 stores data 452, and may be at least partly implemented as permanent or semi-permanent memory such as nonvolatile memory (NVM), EEPROM, ROM, or other memory types configured to retain data 452 even when circuit 424 does not have power. Processing block 444 may be configured to read data from and/or write data to memory 450.

Modulator 446 generates a modulated signal from the output signal generated by processing block 444. In one embodiment, modulator 446 generates the modulated signal by driving the load presented by antenna segment(s) coupled to IC contacts 432/433 to form a backscatter signal as described above. In another embodiment, modulator 446 includes and/or uses a transmitter to generate and transmit the modulated signal via antenna segment(s) coupled to IC contacts 432/433. Modulator 446 may be implemented in any suitable way, for example using a switch, driver, amplifier, and other similar components. Demodulator 442 and modulator 446 may be separate components, combined in a single transceiver circuit, and/or part of processing block 444.

In some embodiments, particularly in those with more than one antenna port, circuit 424 may contain multiple demodulators, rectifiers, PMUs, modulators, processing blocks, and/or memories.

FIG. 5A shows version 524-A of components of circuit 424 of FIG. 4, further modified to emphasize a signal operation during a R→T interval (e.g., time interval 312 of FIG. 3). During the R→T interval, demodulator 442 demodulates an RF signal received from IC contacts 432/433. The demodulated signal is provided to processing block 444 as C_IN, which in some embodiments may include a received stream of symbols. Rectifier and PMU 441 may be active, for example harvesting power from an incident RF waveform and providing power to demodulator 442, processing block 444, and other circuit components. During the R→T interval, modulator 446 is not actively modulating a signal, and in fact may be decoupled from the RF signal. For example, signal routing section 435 may be configured to decouple modulator 446 from the RF signal, or an impedance of modulator 446 may be adjusted to decouple it from the RF signal.

FIG. 5B shows version 524-B of components of circuit 424 of FIG. 4, further modified to emphasize a signal operation during a T→R interval (e.g., time interval 326 of FIG. 3). During the T→R interval, processing block 444 outputs a signal C_OUT, which may include a stream of symbols for transmission. Modulator 446 then generates a modulated signal from C_OUT and sends the modulated signal via antenna segment(s) coupled to IC contacts 432/433, as described above. During the T→R interval, rectifier and PMU 441 may be active, while demodulator 442 may not be actively demodulating a signal. In some embodiments, demodulator 442 may be decoupled from the RF signal during the T→R interval. For example, signal routing section 435 may be configured to decouple demodulator 442 from the RF signal, or an impedance of demodulator 442 may be adjusted to decouple it from the RF signal.

In typical embodiments, demodulator 442 and modulator 446 are operable to demodulate and modulate signals according to a protocol, such as the Gen2 Protocol mentioned above. In embodiments where circuit 424 includes multiple demodulators modulators, and/or processing blocks, each may be configured to support different protocols or different sets of protocols. A protocol specifies, in part, symbol encodings, and may include a set of modulations, rates, timings, or any other parameter associated with data communications. A protocol can be a variant of an internationally ratified protocol such as the Gen2 Protocol, for example including fewer or additional commands than the ratified protocol calls for, and so on. In some instances, additional commands may sometimes be called custom commands.

Figure 6:
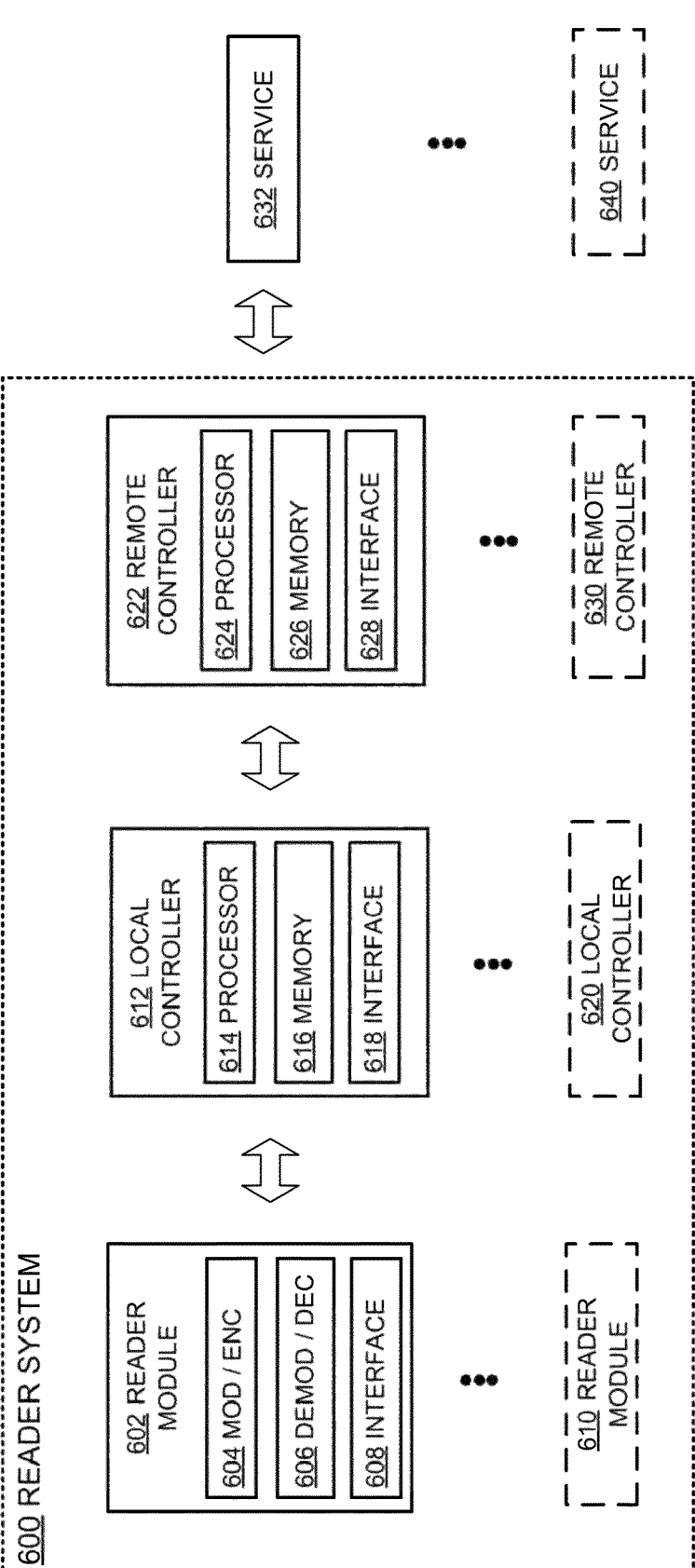
FIG. 6 is a block diagram showing a detail of an RFID reader system, such as the one shown in FIG. 1.

FIG. 6 depicts an RFID reader system 600 according to embodiments. Reader system 600 is configured to communicate with RFID tags and optionally to communicate with entities external to reader system 600, such as a service 632. Reader system 600 includes at least one reader module 602, configured to transmit signals to and receive signals from RFID tags. Reader system 600 further includes at least one local controller 612, and in some embodiments includes at least one remote controller 622. Controllers 612 and/or 622 are configured to control the operation of reader module 602, process data received from RFID tags communicating through reader module 602, communicate with external entities such as service 632, and otherwise control the operation of reader system 600.

In some embodiments, reader system 600 may include multiple reader modules, local controllers, and/or remote controllers. For example, reader system 600 may include at least one other reader module 610, at least one other local controller 620, and/or at least one other remote controller 630. A single reader module may communicate with multiple local and/or remote controllers, a single local controller may communicate with multiple reader modules and/or remote controllers, and a single remote controller may communicate with multiple reader modules and/or local controllers. Similarly, reader system 600 may be configured to communicate with multiple external entities, such as other reader systems (not depicted) and multiple services (for example, services 632 and 640).

Reader module 602 includes a modulator/encoder block 604, a demodulator/decoder block 606, and an interface block 608. Modulator/encoder block 604 may encode and modulate data for transmission to RFID tags. Demodulator/decoder block 606 may demodulate and decode signals received from RFID tags to recover data sent from the tags. The modulation, encoding, demodulation, and decoding may be performed according to a protocol or specification, such as the Gen2 Protocol. Reader module 602 may use interface block 608 to communicate with local controller 612 and/or remote controller 622, for example to exchange tag data, receive instructions or commands, or to exchange other relevant information.

Reader module 602 and blocks 604/606 are coupled to one or more antennas and/or antenna drivers (not depicted), for transmitting and receiving RF signals. In some embodiments, reader module 602 is coupled to multiple antennas and/or antenna drivers. In these embodiments, reader module 602 may transmit and/or receive RF signals on the different antennas in any suitable scheme. For example, reader module 602 may switch between different antennas to transmit and receive RF signals, transmit on one antenna but receive on another antenna, or transmit and/or receive on multiple antennas simultaneously. In some embodiments, reader module 602 may be coupled to one or more phased-array or synthesized-beam antennas whose beams can be generated and/or steered, for example by reader module 602, local controller 612, and/or remote controller 622.

Modulator/encoder block 604 and/or demodulator/decoder block 606 may be configured to perform conversion between analog and digital signals. For example, modulator/encoder block 604 may convert a digital signal received via interface block 608 to an analog signal for subsequent transmission, and demodulator/decoder block 606 may convert a received analog signal to a digital signal for transmission via interface block 608.

Local controller 612 includes a processor block 614, a memory 616, and an interface 618. Remote controller 622 includes a processor block 624, a memory 626, and an interface 628. Local controller 612 differs from remote controller 622 in that local controller 612 is collocated or at least physically near reader module 602, whereas remote controller 622 is not physically near reader module 602.

Processor blocks 614 and/or 624 may be configured to, alone or in combination, provide different functions. Such functions may include the control of other components, such as memory, interface blocks, reader modules, and similar; communication with other components such as reader module 620, other reader systems, services 632/640, and similar; data-processing or algorithmic processing such as encryption, decryption, authentication, and similar; or any other suitable function. In some embodiments, processor blocks 614/624 may be configured to convert analog signals to digital signals or vice-versa, as described above in relation to blocks 604/606; processor blocks 614/624 may also be configured to perform any suitable analog signal processing or digital signal processing, such as filtering, carrier cancellation, noise determination, and similar.

Processor blocks 614/624 may be configured to provide functions by execution of instructions or applications, which may be retrieved from memory (for example, memory 616 and/or 626) or received from some other entity. Processor blocks 614/624 may be implemented in any suitable way. For example, processor blocks 614/624 may be implemented using digital and/or analog processors such as microprocessors and digital-signal processors (DSPs); controllers such as microcontrollers; software running in a machine such as a general purpose computer; programmable circuits such as field programmable gate arrays (FPGAs), field-programmable analog arrays (FPAAs), programmable logic devices (PLDs), application specific integrated circuits (ASIC), any combination of one or more of these; and equivalents.

Memories 616/626 are configured to store information, and may be implemented in any suitable way, such as the memory types described above, any combination thereof, or any other known memory or information storage technology. Memories 616/626 may be implemented as part of their associated processor blocks (e.g., processor blocks 614/624) or separately. Memories 616/626 may store instructions, programs, or applications for processor blocks 614/624 to execute. Memories 616/626 may also store other data, such as files, media, component configurations or settings, etc.

In some embodiments, memories 616/626 store tag data. Tag data may be data read from tags, data to be written to tags, and/or data associated with tags or tagged items. Tag data may include identifiers for items or tags such as electronic product codes (EPCs), unique item identifiers (UIIs), tag identifiers (TIDs), or any other information suitable for identifying individual items or tags. Tag data may also include tag passwords, tag profiles, tag cryptographic keys (secret or public), tag key generation algorithms, and any other suitable information about tags or items associated with tags.

Memories 616/626 may also store information about how reader system 600 is to operate. For example, memories 616/626 may store information about algorithms for encoding commands for tags, algorithms for decoding signals from tags, communication and antenna operating modes, encryption/authentication algorithms, tag location and tracking algorithms, cryptographic keys and key pairs (such as public/private key pairs) associated with reader system 600 and/or other entities, electronic signatures, and similar.

Interface blocks 608, 618, and 628 are configured to communicate with each other and with other suitably configured interfaces. The communications between interface blocks occur via the exchange of signals containing data, instructions, commands, or any other suitable information. For example, interface block 608 may receive data to be written to tags, information about the operation of reader module 602 and its constituent components, and similar; and may send data read from tags. Interface blocks 618 and 628 may send and receive tag data, information about the operation of other components, other information for enabling local controller 612 and remote controller 622 to operate in conjunction, and similar. Interface blocks 608/618/628 may also communicate with external entities, such as services 632, 640, other services, and/or other reader systems.

Interface blocks 608/618/628 may communicate using any suitable wired or wireless means. For example, interface blocks 608/618/628 may communicate over circuit traces or interconnects, or other physical wires or cables, and/or using any suitable wireless signal propagation technique. In some embodiments, interface blocks 608/618/628 may communicate via an electronic communications network, such as a local area network (LAN), a metropolitan area network (MAN), a wide area network (WAN), a network of networks such as the internet. Communications from interface blocks 608/618/628 may be secured, for example via encryption and other electronic means, or may be unsecured.

Reader system 600 may be implemented in any suitable way. One or more of the components in reader system 600 may be implemented as integrated circuits using CMOS technology, BJT technology, MESFET technology, and/or any other suitable physical implementation technology. Components may also be implemented as software executing on general-purpose or application-specific hardware.

In one embodiment, a "reader" as used in this disclosure may include at least one reader module like reader module 602 and at least one local controller such as local controller 612. Such a reader may or may not include any remote controllers such as remote controller 622. A reader including a reader module and a local controller may be implemented as a standalone device or as a component in another device. In some embodiments, a reader may be implemented as a mobile device, such as a handheld reader, or as a component in a mobile device such as a laptop, tablet, smartphone, wearable device, or any other suitable mobile device.

Remote controller 622, if not included in a reader, may be implemented separately. For example, remote controller 622 may be implemented as a local host, a remote server, or a database, coupled to one or more readers via one or more communications networks. In some embodiments, remote controller 622 may be implemented as an application executing on a cloud or at a datacenter.

Functionality within reader system 600 may be distributed in any suitable way. For example, the encoding and/or decoding functionalities of blocks 604 and 606 may be performed by processor blocks 614 and/or 624. In some embodiments, processor blocks 614 and 624 may cooperate to execute an application or perform some functionality. One of local controller 612 and remote controller 622 may not implement memory, with the other controller providing memory.

Reader system 600 may communicate with at least one service 632. Service 632 provides one or more features, functions, and/or capabilities associated with one or more entities, such as reader systems, tags, tagged items, and similar. Such features, functions, and/or capabilities may include the provision of information associated with the entity, such as warranty information, repair/replacement information, upgrade/update information, and similar; and the provision of services associated with the entity, such as storage and/or access of entity-related data, location tracking for the entity, entity security services (e.g., authentication of the entity), entity privacy services (e.g., who is allowed access to what information about the entity), and similar. Service 632 may be separate from reader system 600, and the two may communicate via one or more networks.

In some embodiments, an RFID reader or reader system implements the functions and features described above at least partly in the form of firmware, software, or a combination, such as hardware or device drivers, an operating system, applications, and the like. In some embodiments, interfaces to the various firmware and/or software components may be provided. Such interfaces may include application programming interfaces (APIs), libraries, user interfaces (graphical and otherwise), or any other suitable interface. The firmware, software, and/or interfaces may be implemented via one or more processor blocks, such as processor blocks 614/624. In some embodiments, at least some of the reader or reader system functions and features can be provided as a service, for example, via service 632 or service 640.

Figure 7:
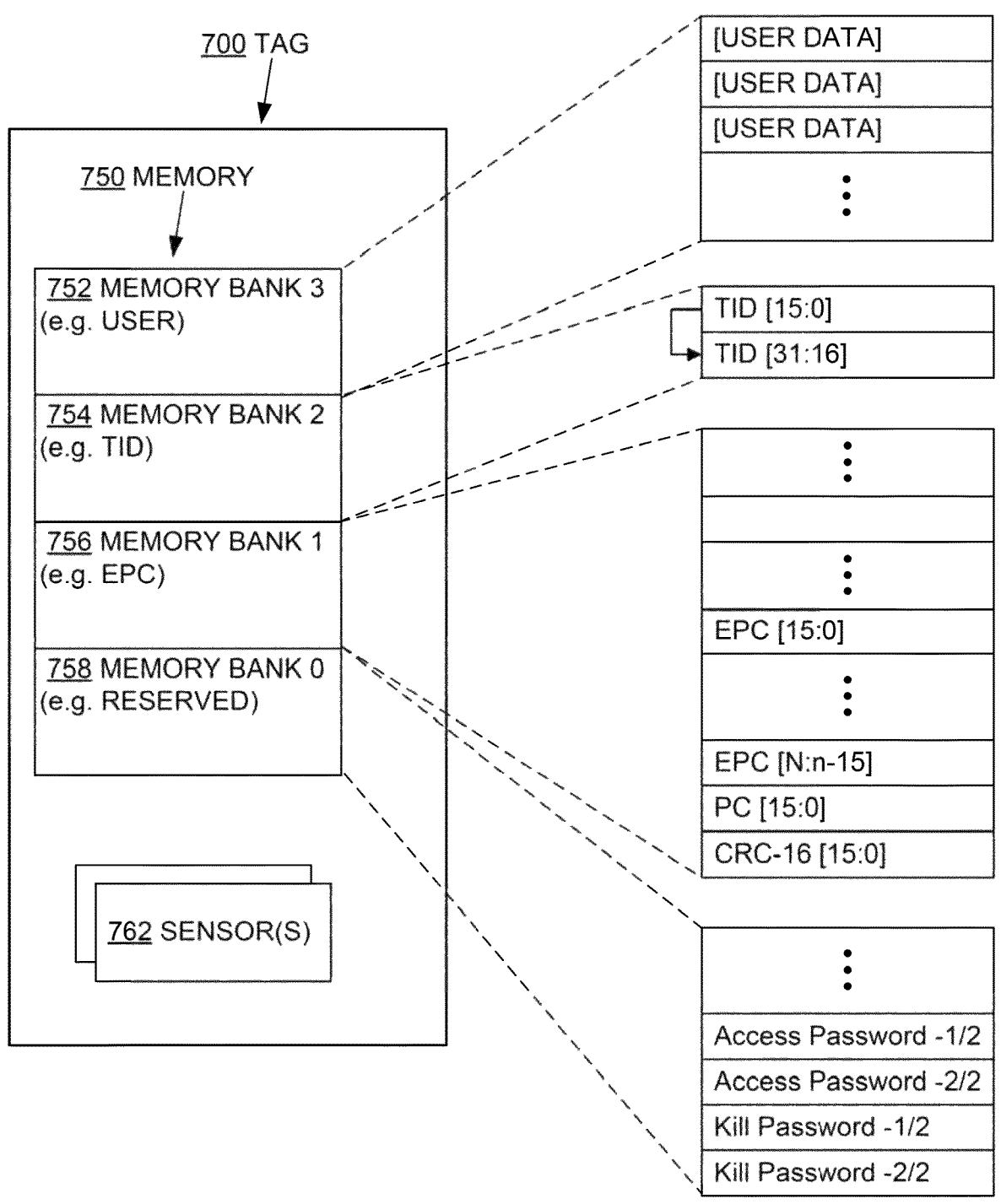
FIG. 7 is a diagram of an example RFID tag IC memory configuration, according to embodiments.

FIG. 7 is a diagram of an example RFID tag IC memory configuration, according to embodiments.

Diagram 700 shows an example RFID tag IC memory configuration, according to embodiments. Diagram 700 depicts an RFID tag IC memory 750, resembling the physical memory configuration described in the Gen2 Protocol. Memory 750 includes four partitions or sections 752, 754, 756, and 758. Partition 752 ("user memory") may be configured to store user data. Partition 754 ("TID memory") may be configured to store an identifier for the tag IC itself, such as a tag identifier or TID. Partition 756 ("EPC memory") may be configured to store an identifier for an item associated with or attached to the tag IC, such as an electronic product code or EPC. Partition 758 ("Reserved memory") may be configured to store information reserved for the tag IC itself or otherwise not necessarily publicly accessible, such as passwords, PINs, cryptographic keys, or similar. The Gen2 Protocol specifies that two passwords, the Access password and the Kill password, can be stored in partition 758. The Access password, if present, can be used to restrict certain tag IC operations as described in the Gen2

Protocol. The Kill password, if present, can be used to cause a tag IC to enter the Killed state as described in the Gen2 Protocol. As these passwords are sensitive, partition 758 is generally not publicly accessible.

In some example implementations, data associated with the modified inventorying commands such as memory configuration bits (e.g., the T bit), data to be compared to an inventorying command mask value, and portions or the entirety of a tag identifier (TID) and/or an item identifier (II) (e.g., EPC or UII), may be stored in one or more specific memory banks. For example, the memory configuration bit(s) may be stored in bank 1 (e.g., the Gen2 Protocol specifies that the T bit is bit 17*h* of bank 1, which is EPC memory). The configuration of tag IC memory 750 is provided as an example. Tag IC memory can have any number of partitions configured to store any suitable information.

FIGS. 8A and 8B illustrate command structures of Query and Select commands according to the Gen2 Protocol.

According to the Gen2 Protocol, a Query command 810 may initiate an inventory round in a specific session. As discussed herein, tags may be in various states such as open, acknowledged, secured, etc. A tag in the acknowledged, open, or secured states that receives a Query command may determine whether the Query command's specified session matches a prior session in which the tag participated. If the specified session matches the prior session, then the tag may invert its inventoried flag for the prior session, also referred to as a "session flag", before it evaluates whether to transition to the ready, arbitrate, or reply states. On the other hand, if the specified session does not match the prior session, then the tag may leave its inventoried flag for the prior session unchanged when beginning the new round. A Query command may include a number of fields starting with a command identifier, followed by a DR (TRcal divide ratio) field which is used to set the T=>R link frequency, an M (cycles per symbol) field which is used to set the T=>R data rate and modulation format, a TRext field which chooses whether a tag prepends the T=>R preamble (described below) with a pilot tone, a Sel field which is used to choose which tags respond to the Query (e.g., based on a previously sent Select command), a Session field which is used to choose a session for the inventory round, a Target field which is used to select whether tags whose inventoried flag is A or B participate in the inventory round as a result of being singulated, a Q field which is used to set the number of slots in the round (based on section 6.3.2.10 in the Gen2 Protocol), and a CRC (cyclical redundancy check) field.

According to the Gen2 Protocol, a Select command 820 allows a reader to select a tag subpopulation based on user-defined criteria, enabling union (U), intersection (∩), and negation (~) based tag partitioning. Readers perform U and ∩ operations by issuing successive Select commands. A Select command 820 can assert or deassert a tag's SL flag, which applies across all four sessions, or it can set a tag's inventoried flag to either A or B in any one of the four sessions. A tag executes a Select from any state except the killed state.

According to the Gen2 Protocol, the Select command 820 may include the following fields: a Target field indicates whether the Select command modifies a tag's SL flag or its inventoried flag, and if modifying the inventoried flag, it further specifies one of four sessions. An Action field specifies how matching and not-matching tags should behave, in terms of asserting or deasserting their SL flags, setting their inventoried flag to A or B, or doing nothing. The criteria for determining whether a tag is matching or not-matching are specified by the MemBank, Pointer, Length and Mask fields. A tag whose memory contents match the values specified in the MemBank, Pointer, Length, and Mask fields is matching, whereas a tag whose memory contents do not match the specified values is not-matching. The MemBank field specifies how a tag applies Mask as described in the Gen2 Protocol. The Pointer field specifies a starting bit address for the Mask comparison. The Length field specifies the length of Mask. The Mask field may specify a bit string that a tag compares to a memory location that begins at Pointer and ends Length bits later. The Truncate field indicates whether a tag's backscattered reply shall be truncated to those EPC bits that follow Mask. The CRC field includes a cyclical redundancy check for error detection.

The Select command described above allows an RFID reader system to specify a particular set of RFID tags that should participate in an inventory round initiated by a subsequent Query command. However, in some situations an RFID tag may not hear the Select command but may hear the subsequent Query command and may participate in the inventory round without meeting the criteria set forth by the Select command. Incorporating at least some of the selection capability of the Select command into a Query-like or other modified inventorying command may address this issue. Moreover, allowing RFID tags to receive and verify sequences of these modified consecutive inventorying commands can allow refinement of a specified set of RFID tags, similar to how successive Select commands can be used but assuring that tags hear all relevant commands before being inventoried.

FIGS. 9A and 9B depict an example command structure for modified inventorying commands, according to examples. FIG. 9A, in diagram 910, shows various fields and field content options for a first portion of a QueryX inventorying command, as well as the entirety of a QueryY inventorying command. As depicted in diagram 910, the QueryX and QueryY inventorying commands share a number of common fields. Such fields include Cmd, Init, Session, Action, SelType, FastMask, "Flt", the Filter fields, and CRC. FIG. 9B, in diagram 920, shows additional fields and field content options for a second portion of the QueryX inventorying command. However, the fields in diagram 920 are not present in the QueryY inventorying command. These QueryX-specific fields include the fields ReplyCRC, AckData, DBLF, DR, M, TRext, Sel, Target, and Q. A complete QueryX command includes all of the fields depicted in diagram 910 and all of the fields depicted in diagram 920, whereas a complete QueryY command includes all of the fields depicted in diagram 910 but none of the fields depicted in diagram 920.

Some of these fields are similar to fields in the Gen2 Query or Select command. For example, Cmd is similar to the Command field in the Query and Select commands. Session, Action, MemBank, Pointer, Length, Mask, Truncate, DR, M, TRext, Sel, Target, Q, and CRC are similar to the corresponding fields in the Query and Select commands.

Other fields differ from the Query and Select commands. For example, the Init field determines whether a certain QueryX or QueryY command is the last command of a sequence, described below in further detail. The SelType and FastMask fields may provide shortcuts for filtering on common criteria, separate from the Filter fields and the filtering capability associated with the Select command. The Flt field indicates the presence of a filter, and the Filter fields describe the filter, similar to the filtering capability of the Select command.

As evident from diagrams 910 and 920, the QueryX and QueryY commands share the same command code. An RFID tag enabled for QueryX and QueryY commands therefore may determine whether a received command with that command code is a QueryX or QueryY based on the identity of a starting signal prepended to the command. According to some examples, the starting signal may be either a preamble or a frame-sync, as described in the Gen2 Protocol.

Figure 10:
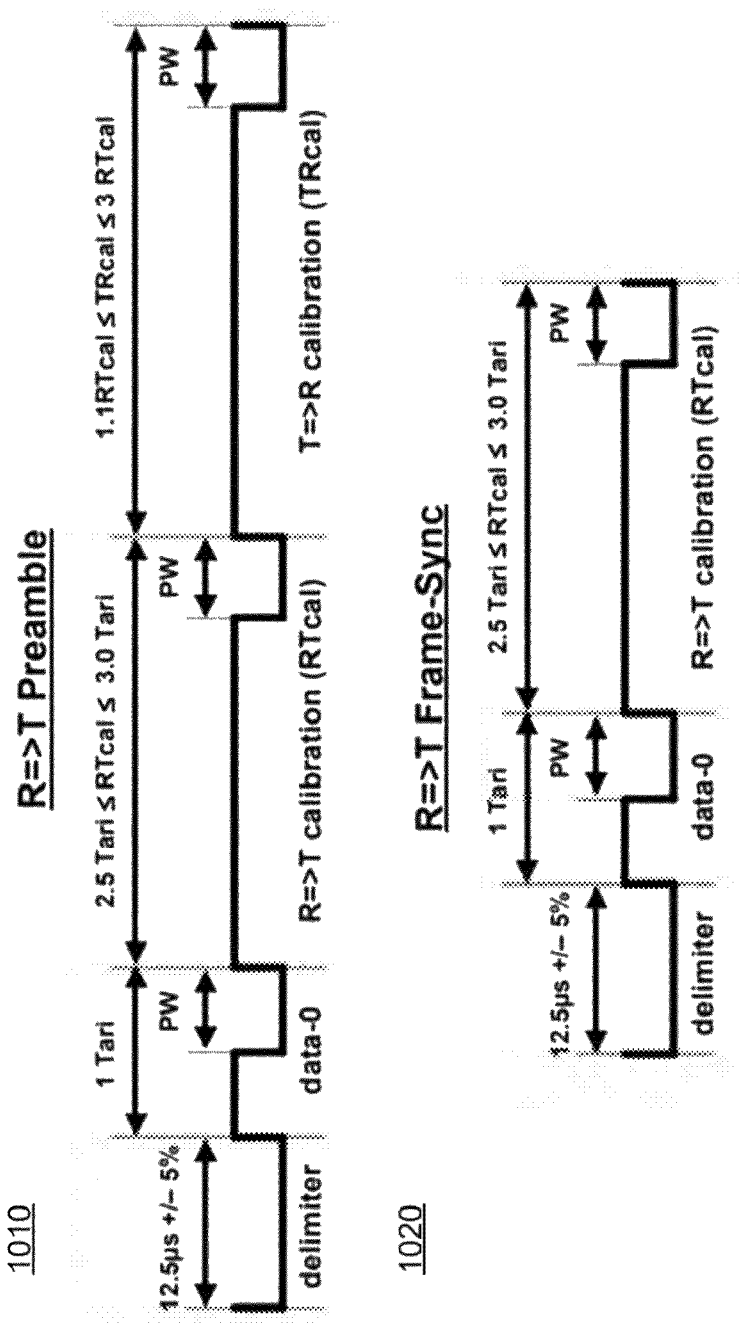
FIG. 10 illustrates a preamble and a frame-sync, according to the Gen2 Protocol and examples.

FIG. 10 depicts a preamble 1010 and a frame-sync 1020, as described in the Gen2 Protocol. In some versions of the Gen2 Protocol, all reader-to-tag signaling is prepended with either a preamble or a frame-sync. For example, a Query, which initiates an inventory round, may be preceded by a preamble, whereas all other signaling may begin with a frame-sync. A preamble is structured to provide modulation and backscatter parameters that tags in the associated inventory round should use when responding. For example, a preamble may include a fixed-length start delimiter, a data-0 symbol, an R=>T calibration (RTcal) symbol, and a T=>R calibration (TRcal) symbol. A reader can then specify a tag's backscatter link frequency (BLF) using a "divide ratio" contained in a Query command and the TRcal symbol in the Query command's preamble, as described in the Gen2 Protocol. A tag participating in the inventory round initiated by that Query command can then determine and use the specified BLF when responding. Other reader commands sent during that same inventory round are prepended with frame-sync signals. A frame-sync is identical to a preamble, minus the TRcal symbol. In general, the same timing and modulation parameters are used throughout a single inventory round. For example, the TRcal symbol is only provided once in an inventory round, in the preamble of the round-initiating Query command. The frame-sync signals of other commands in the inventory round replicate some of the timing/modulation parameters, to help receiving tags recognize that those commands are part of the inventory round.

For the QueryX and QueryY commands described herein, a QueryX command may be preceded by a preamble, whereas a QueryY may be preceded by a frame-sync. When an RFID tag receives a command having the command code shared by QueryX and QueryY, it may determine whether the command is a QueryX or QueryY based on whether the command is preceded by a preamble or a frame-sync. If the former, then the command is a QueryX command. If the latter, then the command is a QueryY command.

Figure 11A:
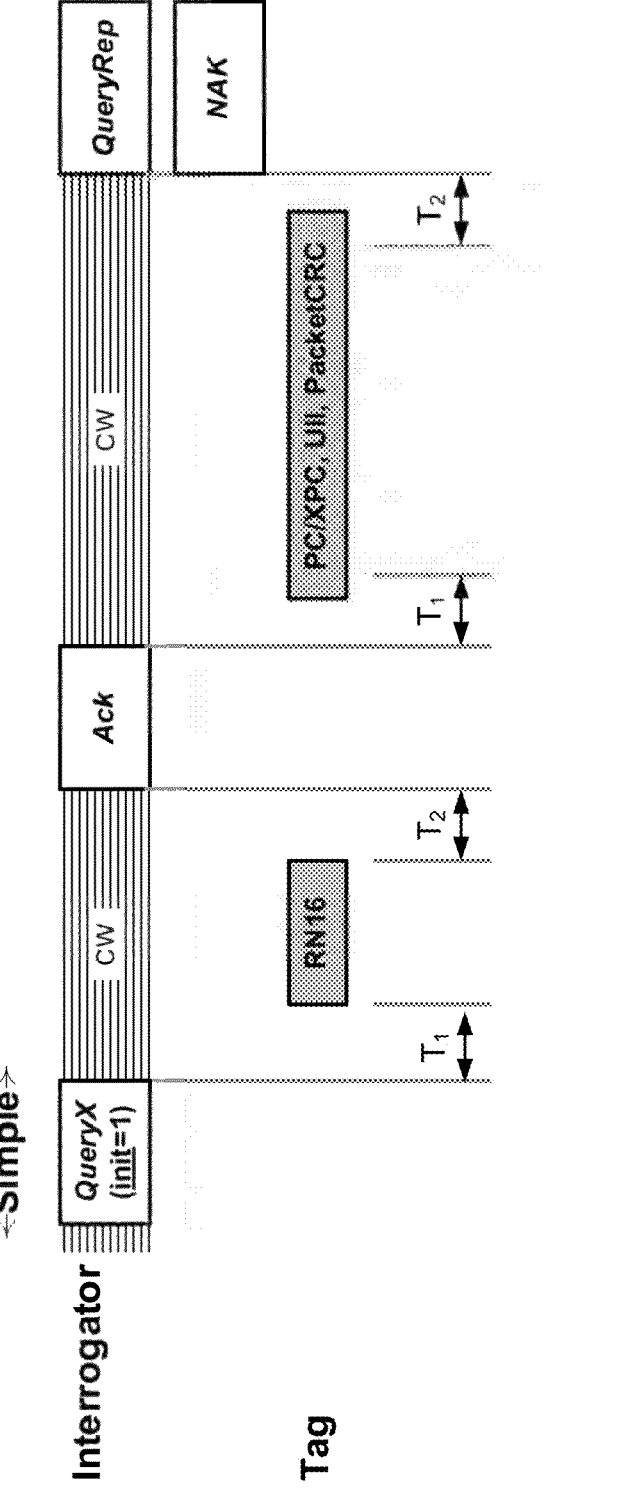
FIGS. 11A and 11B depict example uses of the QueryX and QueryY commands, according to examples.

FIG. 11A is an overview of the QueryX command, according to examples. The QueryX command is similar to the Gen2 Query command in that it is required to start an inventory round. However, QueryX differs from Query in its inclusion of an Init field and various filtering fields, as described herein. In particular, the Init field value (or "Init value") represents a continuation indicator used to construct a potential sequence of consecutive QueryX and QueryY commands. For example, the Init value of a QueryX or QueryY command indicates to a receiving tag whether to expect a subsequent QueryY command or to instead start or initiate the inventory round. A command with an Init value of "O" indicates that the current command sequence has not ended and therefore the tag should expect a subsequent QueryY command. A command with an Init value of "1" indicates that the current command sequence, including the command having the Init of "1", has ended, no subsequent QueryY command in the sequence will be forthcoming, and the inventory round can begin, based on the modulation/ backscatter parameters and filtering criteria contained in the just-ended command sequence.

As shown in diagram 1110, an RFID reader system or interrogator may transmit a QueryX with an Init value of "1". The QueryX may include filtering criteria, as described above. As described above, the QueryX's Init value of "1" indicates that no subsequent QueryY will be forthcoming and that an inventory round can begin or be initiated. After transmitting the QueryX, the interrogator transmits CW. A tag that receives the QueryX and meets its filtering criteria may participate in the inventory round by responding with a collision-resolution code, here denoted "RN16" to represent a pseudo-random 16-bit number. In other examples, a collision-resolution code may be any other code suitable for resolving collisions. Upon receiving the RN16, the interrogator may transmit an ACK command including the RN16, for example as described in the Gen2 Protocol. When the tag receives the ACK command and confirms that it contains the previously provided RN16, it responds with tag information, such as PC/XPC data, unique item identifier (UII) data, packetCRC data, and any other suitable data. The interrogator may then respond with a QueryRep command or other command, such as a NAK (both as described in the Gen2 Protocol). The timing between the interrogator transmissions and tag responses, here denoted $T_1$ and $T_2$, may be protocol-defined (e.g., by the Gen2 Protocol).

In some examples, a sequence of successive or consecutive QueryX and QueryY commands can be chained together to refine the set of RFID tags specified for inventorying. In these examples, each QueryX and QueryY command specifies certain filtering criteria, and the combination of all the filtering criteria in the sequence of commands specifies the set of RFID tags that should participate in the inventory round.

Figure 11B:
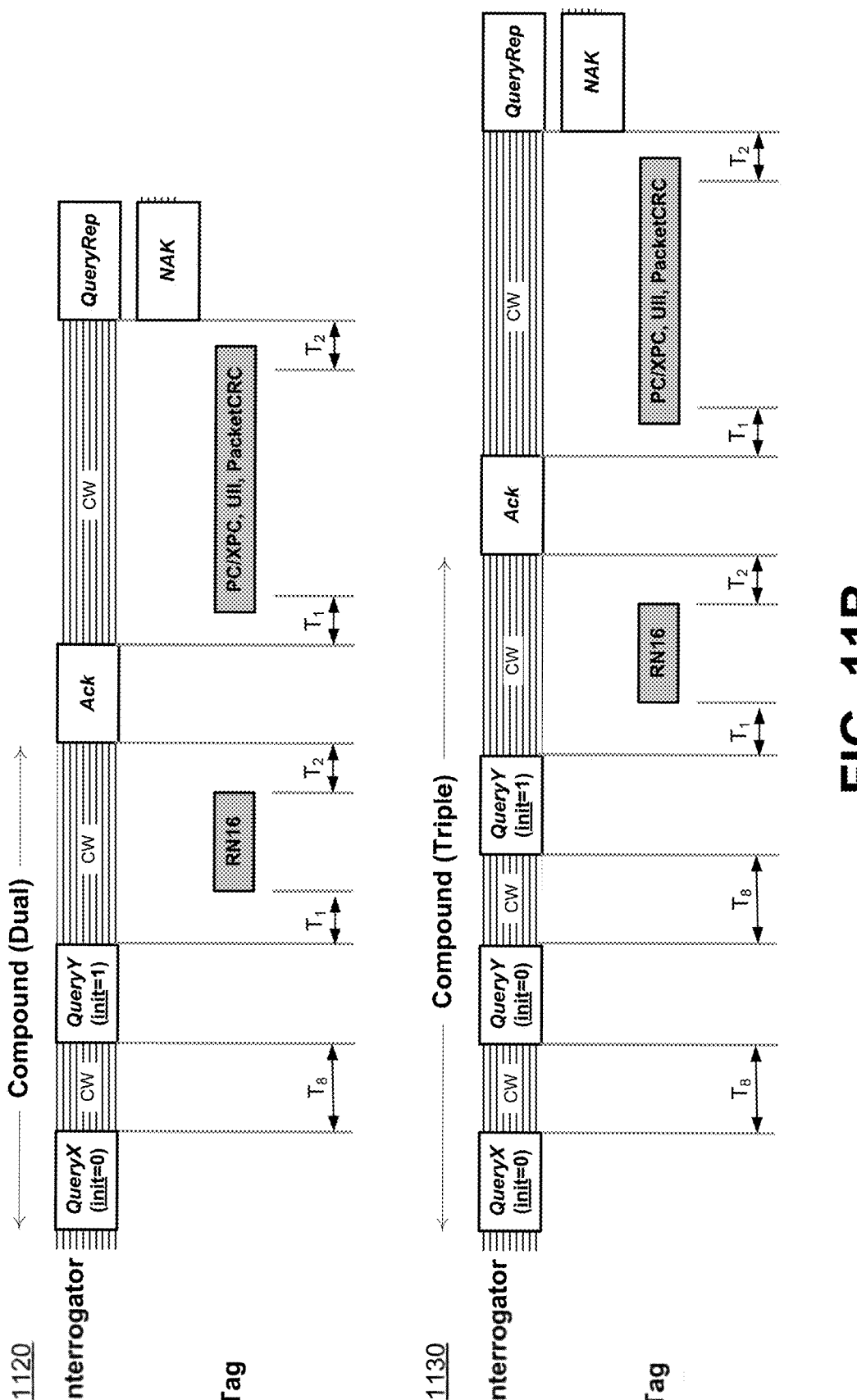

FIG. 11B illustrates combinations of QueryX and QueryY commands, according to examples.

Diagram 1120 depicts a situation in which an RFID reader system or interrogator transmits a QueryX command followed by a QueryY command. The QueryX in diagram 1120 specifies certain filtering criteria and has an Init value of "0", indicating that the QueryX begins a sequence of inventorying commands and receiving tags should expect at least one subsequent QueryY. The following QueryY specifies additional filtering criteria and has an Init value of "1", indicating that it is the end of the sequence, no other QueryY commands will follow, and that an inventory round can begin. As described above, the QueryX may be prepended with a preamble, whereas the QueryY may be prepended with a frame-sync.

A suitably configured tag that receives the QueryX may be able to identify the QueryX command based on its command code and its prepended preamble. Based on the QueryX's Init value of "0", the tag then waits for a subsequent QueryY command. Upon receiving the subsequent QueryY command (identified via its command code and a prepended frame-sync) and determining that it has an Init value of "1", the tag may determine that no other QueryY commands will follow, and will then evaluate the filtering criteria combination specified by the sequence of QueryX and QueryY commands. If the tag determines that it meets the specified filtering criteria combination, then the tag will participate in the inventory round, by responding with a collision-resolution code, as described in diagram 1100. The inventorying process then continues as described in diagram 1100.

Diagram 1130 depicts a situation in which an RFID reader system or interrogator transmits a sequence having a QueryX command followed by first and second QueryY commands. This situation is similar to the situation described in diagram 1120, except that the first QueryY in the sequence has an Init value of "0", indicating that at least one other QueryY will follow. The second QueryY of the sequence has an Init value of "1", indicating that it ends the sequence of QueryX and QueryY commands and that the inventory round can begin. In this situation, a receiving tag evaluates the filtering criteria combination specified by the command sequence of the QueryX command and two QueryY commands to determine whether it should participate in the inventory round.

In both diagrams 1120 and 1130, the allowable timing between successive or consecutive QueryX/QueryY commands is denoted as a time duration $T_8$, also referred to as a $T_8$ timeout. This may be protocol-defined, and may be (a) long enough such that a reader can prepare and send a subsequent QueryY, (b) short enough to greatly reduce the probability of receiving a command from an interfering/unwanted reader in the interim, and (c) long enough so that a receiving tag can start a timer for the $T_8$ timeout and accurately measure its expiration. If a tag receives a QueryY command after the $T_8$ timeout has expired (i.e., if the time since the last received QueryX or QueryY has exceeded the $T_8$ timeout, measured as specified in the Gen2 Protocol), then the tag may ignore the QueryY and also discard the current sequence. In addition, if a tag in the process of receiving a sequence (i.e., the last command it received was a QueryX or QueryY with Init=0) receives an intervening command other than a QueryY command, it will also discard the current sequence.

When a tag discards a sequence, it discards all previously received QueryX and QueryY commands in that sequence, and further does not await additional commands in that sequence. As part of discarding the sequence, the tag also does not determine whether it would participate in the inventory round associated with that sequence, nor does it actually participate in that inventory round.

In general, when a tag receives an inventorying command that initiates (e.g., a QueryX with Init=0) or continues (e.g., a QueryY with Init=0) a sequence, the tag will first await a follow up command (e.g., a QueryY) before taking any action. If the tag determines it has received all commands in the sequence (e.g., by receiving a QueryY with Init=1), it may perform actions such as determining whether the tag satisfies all selection criteria defined in the commands and participate or not participate in the inventory round based on the determination. On the other hand, if the tag determines that it has received a command that is not in the sequence (e.g., a command other than a QueryY), or if the $T_8$ timeout expires before it has received a subsequent command in the sequence, it will discard the sequence, as described above.

Modified inventorying commands such as the QueryX and QueryY commands may include filtering criteria. In some examples, filtering criteria may include, but are not limited to, fast (short payload) filtering on common parameters such as TID or flexible (longer payload) filtering with Membank, Pointer, Length, Mask, etc. The scalable payload may include or exclude fast or flexible filtering. In an example scenario, the reader may transmit a QueryX command or QueryX/QueryY sequence with specific filtering criteria. Upon receiving a (selected) tag's collision-resolution code, the reader may transmit an ACK command and receive tag information (e.g., PC/XPC, UII, packet CRC, etc.). If the tag's information is valid, the reader may follow with a QueryRep or other command. If the tag's information is invalid, the reader may send a NAK command. A select type field in the commands of the command sequence may allow filtering on common criteria using a short payload. For example, the select type field may be a 3-bit field with the various bit configurations corresponding to the various filter criteria such as various product codes (PC, EPC, XPC), cryptographic suite indicator (CCSI), mask designer ID (MDID), etc. Other tag data such as TID, IID, etc. may also be used. A fast mask field may include a mask with up to 9 bits in length, for example.

In other examples, a flexible filter feature in the sequence of commands may be activated by the filter field indicating whether the filter is included or not. The flexible filter may allow relative comparison such as the filter mask being greater than or equal or less than or equal to an integer value specified by a memory bank, pointer, and length fields in the command. Similarly, the filter condition may include the mask being equal to or not equal to the integer value specified by a memory bank, pointer, and length fields in the command.

While in the above description the tag determines whether stored data matches the mask value, in some embodiments the tag determines whether the mask value corresponds to the stored data as opposed to matching it. For example, the tag may perform a computation to derive a first value from the stored data and/or a second value from the mask value, and either compare the first value to the mask value or the second value or compare the stored data to the second value. As another example, the tag may determine whether the mask value corresponds to some other value known to the tag, in addition to or instead of stored data. This other value could be derived from tag features or capabilities.

FIG. 12 illustrates a flow diagram of a method to use sequential commands in initiating inventorying according to embodiments. The method 1200 may begin with an RFID tag receiving a first inventorying command at block 1202. At block 1204, the tag may determine that the first inventorying command is an initial inventorying command in a command sequence based on the command beginning with a preamble and/or including an Init value of 0, for example.

At block 1206, the tag may receive a second inventorying command, and at block 1208 may determine that the second inventorying command is part of the command sequence based on a timing between the first and second inventorying commands (a time duration between the end of the first inventorying command and receipt of the second command), start signals of the commands (e.g., first command begins with preamble, second command begins with frame-sync), and/or Init values in the commands. If the second inventorying command is not received within a predefined time period following the first inventorying command, the tag may discard the command sequence; otherwise, the tag may continue to process the command sequence at block 1210. For example, the tag may await yet another subsequent command in the command sequence, or the tag may begin participating in an inventory round.

In some examples, the first inventorying command (e.g., QueryX) may have an Init value of "0" that causes the tag to await a subsequent QueryY command. An Init value of "1" of the subsequent inventorying command (e.g., QueryY) may indicate to the tag that no other subsequent commands will follow, whereas an Init value of "0" may indicate that at least one more subsequent command is expected. Once the command sequence is completed (based on the last inventorying command's Init value), the tag may evaluate the filtering criteria combination specified by the series of the inventorying commands (QueryX and QueryY(s)). If the tag determines that it meets the specified filtering criteria combination, then the tag may participate in the inventory round, for example by responding with a collision-resolution code.

While inventorying command sequences are described above in terms of QueryX and QueryY commands, inventorying command sequences with any other suitable commands can be used. Such inventorying command sequences involve inventorying commands that (a) share the same command codes and (b) can be differentiated by their starting signals. Such starting signals may include a preamble and a frame-sync as described above or could be any suitable starting signal. In some examples the starting signal(s) provide modulation and backscatter parameters for receiving tags to use when replying. The inventorying commands may each include a continuation indicator, similar to the Init value described above, indicating whether a particular inventorying command ends a sequence or more inventorying commands in the sequence are expected.

According to some examples, a Radio Frequency Identification (RFID) integrated circuit (IC) configured to receive and process a sequence of consecutive inventorying commands, the sequence configured to initiate an inventory round, may include a transceiver configured to receive commands and send replies; and a processing block coupled to the transceiver. The processing block may be configured to receive, via the transceiver, a first command preceded by a first starting signal and including both a command code and a continuation indicator; determine, from at least the command code and the continuation indicator, that the first command is a first inventorying command in the sequence; receive, via the transceiver, a second command; determine whether the second command is a second inventorying command in the sequence by at least determining whether the second command has the command code and is preceded by a second starting signal different from the first starting signal; and if the second command is the second inventorying command in the sequence, then one of initiate the inventory round and await a third command in the sequence, otherwise discard the sequence.

According to other examples, the processing block may be further configured to determine that the first command is a first inventorying command in the sequence by determining that the first starting signal is a preamble; and the second starting signal may be a frame-sync. The first inventorying command in the sequence may be a QueryX command according to the Gen2 Protocol and the second inventorying command in the sequence may be a QueryY command according to the Gen2 Protocol. The processing block may be further configured to determine that the second command is the second inventorying command in the sequence by determining whether the second command was received within a first time duration from the end of the first command.

According to further examples, the first time duration may be a $T_8$ timeout according to the Gen2 Protocol. The processing block may be further configured to determine that the second command is the second inventorying command in the sequence by determining that no intervening commands were received between first and second commands. The processing block may be further configured to, if the second command is the second inventorying command in the sequence, initiate the inventory round if a continuation indicator in the second command indicates that it is the final command in the sequence, otherwise await the third command in the sequence. The processing block may be configured to discard the sequence by not initiating the inventory round and not awaiting the third command in the sequence.

According to some examples, a method for a Radio Frequency Identification (RFID) integrated circuit to receive and process a sequence of consecutive inventorying commands, the sequence configured to initiate an inventory round, may include receiving a first command preceded by a first starting signal and including both a command code and a continuation indicator; determining, from at least the command code and the continuation indicator, that the first command is a first inventorying command in the sequence; receiving a second command; determining whether the second command is a second inventorying command in the sequence by at least determining whether the second command has the command code and is preceded by a second starting signal different from the first starting signal; and if the second command is the second inventorying command in the sequence then one of initiating the inventory round and awaiting a third command in the sequence, otherwise discarding the sequence.

According to other examples, the method may further include determining that the first command is a first inventorying command in the sequence by determining that the first command is preceded by a preamble. The first inventorying command in the sequence may be a QueryX command according to the Gen2 Protocol and the second inventorying command in the sequence may be a QueryY command according to the Gen2 Protocol. The method may further include determining that the second command is the second inventorying command in the sequence by determining whether the second command was received within a first time duration from the end of the first command. The first time duration may be a $T_8$ timeout according to the Gen2 Protocol.

According to further examples, the method may further include determining that the second command is the second inventorying command in the sequence by determining that no intervening commands were received between first and second commands. The method may further include, if the second command is the second inventorying command in the sequence, initiating the inventory round if a continuation indicator in the second command indicates that it is the final command in the sequence, otherwise awaiting the third command in the sequence. The method may further include discarding the sequence by not initiating the inventory round and not awaiting the third command in the sequence.

According to some examples, a method for a Radio Frequency Identification (RFID) reader configured to send a sequence of consecutive inventorying commands, the sequence configured to initiate an inventory round, may include initiating the sequence by transmitting an initial inventorying command, the initial inventorying command preceded by a preamble and including a first command code and an initial continuation indicator indicating that the initial inventorying command is not the final command in the sequence; and ending the sequence by transmitting a final inventorying command, the final inventorying command preceded by a frame-sync and including the first command code and a final continuation indicator indicating that the final inventorying command is the final command in the sequence.

According to other examples, the method may further include continuing the sequence by transmitting another inventorying command between the initial and final inventorying commands, the other inventorying command preceded by a frame-sync and including the first command code and another continuation indicator indicating that the other inventorying command is not the final command in the sequence. The method may further include beginning to transmit the frame-sync of the final inventorying command within a $T_8$ timeout of the end of an immediately preceding inventorying command in the sequence. The initial inventorying command may be a QueryX command according to the Gen2 Protocol and the final inventorying command may be a QueryY command according to the Gen2 Protocol.

As mentioned previously, embodiments are directed to modifying RFID tag inventorying. Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor but may be implemented in other processing elements such as FPGAs, DSPs, or other devices as described above.

Performing the steps, instructions, or operations of a program requires manipulating physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. Information represented by the states of these quantities may be referred-to as bits, data bits, samples, values, symbols, characters, terms, numbers, or the like. However, these and similar terms are associated with and merely convenient labels applied to the appropriate physical quantities, individually or in groups.

Embodiments furthermore include storage media. Such media, individually or in combination with others, have stored thereon instructions, data, keys, signatures, and other data of a program made according to the embodiments. A storage medium according to embodiments is a computer-readable medium, such as a memory, and can be read by a processor of the type mentioned above. If a memory, it can be implemented in any of the ways and using any of the technologies described above.

Even though it is said that a program may be stored in a computer-readable medium, it does not need to be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary or thought of in terms of various interconnected distinct software modules.

The foregoing detailed description has set forth various embodiments of the devices and/or processes via the use of block diagrams and/or examples. Insofar as such block diagrams and/or examples contain one or more functions and/or aspects, each function and/or aspect within such block diagrams or examples may be implemented individually and/or collectively, by a wide range of hardware, software, firmware, or virtually any combination thereof. Some aspects of the embodiments disclosed herein, in whole or in part, may be equivalently implemented employing integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and/or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, configurations, tags, RFICs, readers, systems, and the like, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

In general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). If a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). Any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

For any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. All language such as "up to," "at least," "greater than," "less than," and the like include the number recited and refer to ranges which can be subsequently broken down into subranges as discussed above. Finally, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

We claim:

1. A Radio Frequency Identification (RFID) integrated circuit (IC) configured to receive and process a sequence of consecutive inventorying commands, the sequence configured to initiate an inventory round, the IC comprising:
a transceiver configured to receive commands and send replies; and
a processing block coupled to the transceiver and configured to:
receive, via the transceiver, a first command preceded by a first starting signal and including both a command code and a continuation indicator;
determine, from at least the command code and the continuation indicator, that the first command is a first inventorying command in the sequence;
receive, via the transceiver, a second command;
determine whether the second command is a second inventorying command in the sequence by at least determining whether the second command has the command code and is preceded by a second starting signal different from the first starting signal; and
if the second command is the second inventorying command in the sequence, then one of initiate the inventory round and await a third command in the sequence, otherwise discard the sequence.

2. The RFID IC of claim 1, wherein:
the processing block is further configured to determine that the first command is a first inventorying command in the sequence by determining that the first starting signal is a preamble; and
the second starting signal is a frame-sync.

3. The RFID IC of claim 2, wherein the first inventorying command in the sequence is a QueryX command according to the Gen2 Protocol and the second inventorying command in the sequence is a QueryY command according to the Gen2 Protocol.

4. The RFID IC of claim 1, wherein the processing block is further configured to determine that the second command is the second inventorying command in the sequence by determining whether the second command was received within a first time duration from the end of the first command.

5. The RFID IC of claim 4, wherein the first time duration is a $T_8$ timeout according to the Gen2 Protocol.

6. The RFID IC of claim 1, wherein the processing block is further configured to determine that the second command is the second inventorying command in the sequence by determining that no intervening commands were received between first and second commands.

7. The RFID IC of claim 1, wherein the processing block is further configured to, if the second command is the second inventorying command in the sequence, initiate the inventory round if a continuation indicator in the second command indicates that it is the final command in the sequence, otherwise await the third command in the sequence.

8. The RFID IC of claim 1, wherein the processing block is configured to discard the sequence by not initiating the inventory round and not awaiting the third command in the sequence.

9. A method for a Radio Frequency Identification (RFID) integrated circuit to receive and process a sequence of consecutive inventorying commands, the sequence configured to initiate an inventory round, the method comprising:
receiving a first command preceded by a first starting signal and including both a command code and a continuation indicator;
determining, from at least the command code and the continuation indicator, that the first command is a first inventorying command in the sequence;
receiving a second command;
determining whether the second command is a second inventorying command in the sequence by at least determining whether the second command has the command code and is preceded by a second starting signal different from the first starting signal; and
if the second command is the second inventorying command in the sequence then one of initiating the inventory round and awaiting a third command in the sequence, otherwise discarding the sequence.

10. The method of claim 9, further comprising determining that the first command is a first inventorying command in the sequence by determining that the first command is preceded by a preamble.

11. The method of claim 10, wherein the first inventorying command in the sequence is a QueryX command according to the Gen2 Protocol and the second inventorying command in the sequence is a QueryY command according to the Gen2 Protocol.

12. The method of claim 9, further comprising determining that the second command is the second inventorying command in the sequence by determining whether the second command was received within a first time duration from the end of the first command.

13. The method of claim 12, wherein the first time duration is a $T_8$ timeout according to the Gen2 Protocol.

14. The method of claim 9, further comprising determining that the second command is the second inventorying command in the sequence by determining that no intervening commands were received between first and second commands.

15. The method of claim 9, further comprising, if the second command is the second inventorying command in the sequence, initiating the inventory round if a continuation indicator in the second command indicates that it is the final command in the sequence, otherwise awaiting the third command in the sequence.

16. The method of claim 9, further comprising discarding the sequence by not initiating the inventory round and not awaiting the third command in the sequence.

17. A method for a Radio Frequency Identification (RFID) reader configured to send a sequence of consecutive inventorying commands, the sequence configured to initiate an inventory round, the method comprising:

initiating the sequence by transmitting an initial inventorying command, the initial inventorying command preceded by a preamble and including a first command code and an initial continuation indicator indicating that the initial inventorying command is not the final command in the sequence; and ending the sequence by transmitting a final inventorying command, the final inventorying command preceded by a frame-sync and including the first command code and a final continuation indicator indicating that the final inventorying command is the final command in the sequence.

18. The method of claim 17, further comprising:

continuing the sequence by transmitting another inventorying command between the initial and final inventorying commands, the other inventorying command preceded by a frame-sync and including the first command code and another continuation indicator indicating that the other inventorying command is not the final command in the sequence.

19. The method of claim 17, further comprising beginning to transmit the frame-sync of the final inventorying command within a $T_8$ timeout of the end of an immediately preceding inventorying command in the sequence.

20. The method of claim 17, wherein the initial inventorying command is a QueryX command according to the Gen2 Protocol and the final inventorying command is a QueryY command according to the Gen2 Protocol.

* * * * *